US011845487B2

(12) United States Patent
Chong Hok Yuen et al.

(10) Patent No.: US 11,845,487 B2
(45) Date of Patent: *Dec. 19, 2023

(54) STEERING COLUMN BREAKAWAY AND ENERGY ABSORPTION APPARATUS

(71) Applicant: NSK Americas, Inc., Ann Arbor, MI (US)

(72) Inventors: Isabel Chong Hok Yuen, Ypsilanti, MI (US); Victor Corona Martinez, Ann Arbor, MI (US); David Ray Hartman, Brighton, MI (US)

(73) Assignee: NSK Americas, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,735

(22) Filed: Oct. 24, 2022

(65) Prior Publication Data
US 2023/0053406 A1    Feb. 23, 2023

Related U.S. Application Data

(63) Continuation of application No. 17/275,545, filed as application No. PCT/US2019/048964 on Aug. 30, 2019, now Pat. No. 11,518,428.

(60) Provisional application No. 62/724,827, filed on Aug. 30, 2018.

(51) Int. Cl.
*B62D 1/19*    (2006.01)
*B62D 1/184*    (2006.01)
*F16F 7/12*    (2006.01)

(52) U.S. Cl.
CPC ............. *B62D 1/195* (2013.01); *B62D 1/184* (2013.01); *B62D 1/192* (2013.01); *F16F 7/128* (2013.01)

(58) Field of Classification Search
CPC ........ B62D 1/195; B62D 1/184; B62D 1/192; F16F 7/128
See application file for complete search history.

(56) References Cited

U.S. PATENT DOCUMENTS 5,547,221 A    8/1996  Tomaru et al.
6,467,807 B2   10/2002 Ikeda et al.
7,264,274 B2    9/2007 Ridgway et al.
(Continued)

FOREIGN PATENT DOCUMENTS

DE    102011083190 A1    3/2013
DE    102020120010 A1    2/2021

OTHER PUBLICATIONS

International Search Report and Written Opinion for International Application PCT/US2019/048964, dated Dec. 11, 2019.

*Primary Examiner* — Drew J Brown
(74) *Attorney, Agent, or Firm* — The Dobrusin Law Firm, P.C.

(57) ABSTRACT

An article for a steering column assembly (10) including a connection member (60) having a base portion (62) adapted to be attached to a column tube (30) of the steering column assembly (10) and opposing side walls (64) extending from the base portion (62). The article further includes an energy absorption member (80) having a first generally flat segment (82), a second generally flat segment (84) generally parallel to the first generally flat segment (82), and a curved portion (86) therebetween. The energy absorption member (80) extends from the base of the connection member (60). The present teachings also envision a telescoping adjustment subassembly and a steering column assembly (10) employing the article.

20 Claims, 3 Drawing Sheets

(56) References Cited

U.S. PATENT DOCUMENTS

| | | |
|---|---|---|
| 8,047,096 B2 | 11/2011 | Ridgway et al. |
| 9,409,590 B2 | 8/2016 | Johta et al. |
| 9,428,213 B2 | 8/2016 | Tinnin |
| 9,904,590 B2 | 2/2018 | Amanuma et al. |
| 2008/0111363 A1 | 5/2008 | Menjak et al. |
| 2008/0236325 A1 | 10/2008 | Ridgway et al. |
| 2009/0174177 A1 | 7/2009 | Gerzseny et al. |
| 2010/0032933 A1 | 2/2010 | Cymbal et al. |
| 2010/0300238 A1 | 12/2010 | Ridgway et al. |
| 2011/0210536 A1 | 9/2011 | Monteil et al. |
| 2013/0233117 A1 | 9/2013 | Read et al. |
| 2015/0096404 A1 | 4/2015 | Martinez et al. |

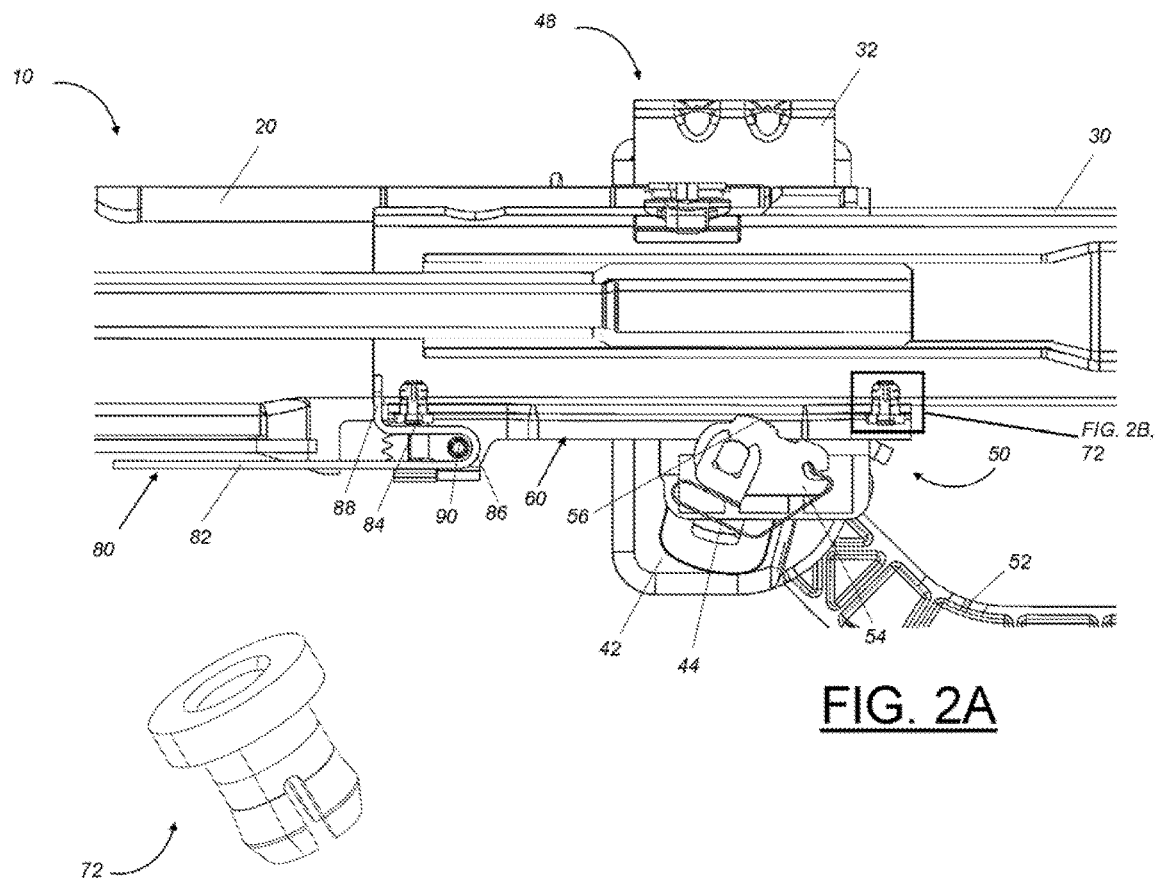
FIG. 2A
FIG. 2B
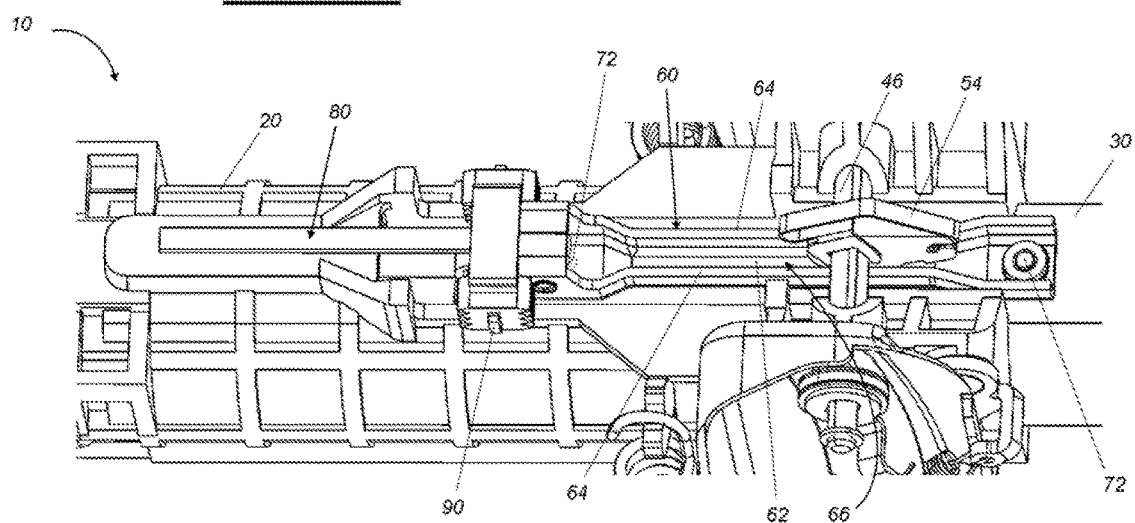
FIG. 2C

STEERING COLUMN BREAKAWAY AND ENERGY ABSORPTION APPARATUS

FIELD

In general, the present teachings relate to an improved collapsible steering column assembly and methods associated with the same (e.g., methods of providing energy absorption, such as in a secondary impact).

BACKGROUND

During a vehicle collision, there are commonly two impacts. In a primary impact, the vehicle impacts another object. In a secondary impact, a vehicle occupant impacts a component of the vehicle. For example, a vehicle operator sometimes impacts the steering wheel due to inertia. In order to help try to protect drivers from such secondary impacts, it has become common practice to use an impact-absorbing type steering column. A collapsible steering column system is an example of an impact-absorbing type steering column.

The structure of an impact-absorbing type steering column apparatus is such that when the driver suffers a secondary impact, the impact energy acts on the steering column in the frontward direction of the vehicle. The steering column may detach from one or more fixation points with the vehicle body and move forward (e.g., in a collapse stroke), so that the impact energy is absorbed in the course of the collapse stroke. An external collapsing column assembly is an example of a system in which the entire column will translate relative to its fixation points. An internal collapsing column assembly typically will be fixed at one or more fixation points near one of the ends of the assembly within the vehicle. During a collapse stroke from a secondary impact, components of the assembly will longitudinally collapse (e.g., generally within the volume it occupies within the vehicle in normal operation; that is, generally within its "footprint" in the vehicle), but generally will not collapse beyond a certain distance relative to a predetermined fixation point. An internal collapsing system thus has a stroke, but may remain fixed to the vehicle at the one or more fixation points.

For many applications, steering column assemblies incorporate one or both of a tilt or telescopic function. For these applications, it is common to employ levers for manual performance of such functions by a vehicle user. By way of example, in what is known as a "manual rake and reach" steering column assembly, the assembly will have both a tilt ("rake") and a telescopic ("reach") function, with a lever provided for a vehicle user to manually release for affording rake and reach adjustment to a selected position, and then to re-engage for fixing the steering column in the selected position.

Notwithstanding efforts to improve collapsible steering column assemblies, (e.g., internally collapsible steering column assemblies), there remains a need for alternative assemblies, particularly those in which during an impact such as a secondary impact, one or both of a user operating device (e.g., a lever) and a steering wheel (if employed) may be translated forward and away from a vehicle user. There also remains a need for additional energy absorption within the assembly.

The following U.S. patent documents may be related to the present teachings: U.S. Publication Nos. 2008/0236325; 2008/0111363; 2009/0174177; 2010/0300238; 2010/0032933; and 2015/0096404; and U.S. Pat. Nos. 8,047,096; 9,428,213; and 9,904,590, all of which are incorporated by reference herein for all purposes. U.S. Publication No. 2013/0233117 also may have teachings related to the present teachings and is incorporated by reference herein.

SUMMARY

The present teachings make use of a simple, yet elegant, construction approach by which relatively few components can be employed for achieving an energy absorbing steering column assembly, such as a collapsible steering column assembly. The steering column assembly may be an adjustable (e.g., for rake and/or reach) steering column assembly. For example, though having applicability to externally collapsing assemblies (which are contemplated within the present teachings), the steering column assembly herein may be an internally collapsible assembly. It may be an assembly that is affixed within a vehicle at one or more fixation points so that upon a secondary impact the steering column assembly resists forward motion substantially beyond (e.g., about 10 mm or more or about 20 mm or more beyond) the one or more fixation points. It may be a collapsible steering column assembly that exhibits relatively good energy absorption characteristics, especially during a secondary impact. It may be a collapsible steering column assembly that exhibits longitudinal displacement (e.g., forward translation) of one or more components of the assembly (e.g., a column tube) during a secondary impact.

As one general way of characterizing the present teachings, there is envisioned a collapsing steering column assembly. It may be an internally collapsing assembly or an externally collapsing assembly. Though, it is particularly attractive for an internally collapsing assembly in which at least a portion of the assembly is secured against any substantial forward movement (e.g., about 50 mm or less, about 20 mm or less, or about 10 mm or less) within a vehicle. The steering column assembly may include a steering wheel position adjustment portion (e.g., an arrangement adapted for adjusting the rake and/or reach position of a steering wheel relative to a vehicle operator, such as a telescoping tubular arrangement). It may include a bracket (e.g., a tilt bracket) for at least partially carrying the steering wheel position adjustment portion and attaching the assembly within the vehicle. It may include a securing member (e.g., as discussed elsewhere herein, a tilt bolt or other elongated member, such as one that is adapted for applying a securing force to help maintain a steering column assembly in a desired position) for fixing the position of the steering wheel position adjustment portion (such as by operation of a lever that is adapted to be employed by an operator to apply or remove a securing force). During normal operation, the steering column assembly may be in a secure engagement position, where at least a portion of the steering shaft support structure (e.g., a column tube, a column housing, or both) is fixed in a fixed position in the steering column assembly. The secure engagement position may be the adjusted position selected by the user in an adjustable position steering column assembly.

It is envisioned that the assembly may include an energy absorption structure capable of deformation during an impact. For instance, the energy absorption structure may be configured in a manner such that it can allow for controlled movement of a component relative to another so that one or more components of the steering wheel adjustment portion translate forward in the event of an impact, such as a secondary impact. It is also envisioned that the at least one energy absorption device is operable to absorb energy in a collapse stroke occasioned in response to a force applied to it due to the secondary impact. For instance, forward travel of the column tube may occur as a result of the impact such as a secondary impact, which may operatively engage the at least one energy absorption device or structure (e.g., a plastically deformable elongated member such as a metal strip or bend plate).

In one general aspect of the teachings, there is contemplated a collapsing steering column assembly that includes a column tube, a steering shaft (adapted for coupling with a steering wheel or other like structure) that is supported for rotation at least in part by the column tube and having a longitudinal axis; and a suitable bracket (or one or more brackets) for carrying the column tube and attaching the assembly within a vehicle (e.g., to a cross-vehicle structure). The bracket or brackets may be coupled with a column housing, such as for securing the column housing in a generally fixed position within the vehicle. The column tube may be configured to be carried by the column housing (e.g., in a telescoping manner), in one or more fixed positions. For example, the column tube may be telescopically adjustable (e.g., by way of a manual adjustment lever or a motor) within and/or relative to the column housing. The column housing and the column tube each will have a longitudinal axis. Their respective longitudinal axes may be generally aligned (e.g., they may be generally co-axial). The position of the column tube relative to the column housing may be fixed by way of a securing member (e.g., a tilt bolt or other elongated member as will be described) that is located in a secure engagement position and applies a force (e.g., a generally transverse force relative to the longitudinal axes of the column tube and the column housing) to at least one of the column housing or column tube for causing a secure engagement of the column tube and the column housing (e.g., a clamped engagement, an interference, interlock, detent or other mechanical engagement). In the event of a secondary impact exceeding a threshold load, the column tube may be permitted to translate (e.g., forward) relative to the column housing, and may also cause an energy absorption device (e.g., a metal strip) to absorb energy from the secondary impact (e.g., by plastically deforming (with or without elongation, compaction, shear strain, and/or buckling)).

The present teachings may relate to a collapsing steering column assembly (e.g., an internally collapsing steering column assembly) for an automotive vehicle, including a column tube; a steering shaft supported for rotation at least in part by the column tube and having a longitudinal axis; and one or more brackets (e.g., a tilt bracket adapted for receiving or otherwise carrying and/or supporting at least a portion of the column tube and/or for mounting the steering column assembly within the automotive vehicle). A column housing may be employed for telescopically carrying the column tube (e.g., the column tube may be configured to be located within the column housing). The column housing and column tube may be part of a steering shaft support structure. The column housing may have a portion that is adapted to be pivotally mounted within a vehicle (e.g., in a fixed position, or in a position that allows slight forward travel (e.g., about 20 mm or less or about 10 mm or less) of the column housing from a load occasioned by a secondary impact). The steering column assembly may include one or more brackets or at least one portion adapted to mount the assembly to a vehicle (e.g., to a cross-vehicle structure), and a portion adapted to carry (directly or indirectly) the column tube. For example, the bracket may include an upper wall for attachment to the vehicle and an outwardly projecting wall structure that projects away from the upper wall (and which may be configured to flank the column tube and/or afford at least a partial vertical translation of the column tube relative to the upper wall). A manually operated steering wheel adjustment subassembly may also be employed. It may be adapted for (i) selectively adjusting the steering shaft in a fore or aft direction generally along the longitudinal axis; (ii) selectively raising or lowering the steering shaft; or (iii) both (i) and (ii). The steering wheel adjustment subassembly may include a lever adapted for manually actuating the subassembly, and at least one engagement member that is brought into and out of engagement with the column tube or a structure attached to the column tube for selectively locking the steering shaft into a position (which may be relative to the position of the column housing) desired by a user. The column housing may be pivotally mounted at a pivot mounting location within the automotive vehicle. The column housing may at least partially surround the column tube. The column housing, the tilt bracket, and/or the column tube may include one or more structures and/or mechanisms adapted for securing the column tube into position using the lever. Desirably, during a secondary impact, the column housing remains in a generally fixed position relative to the pivot mounting location (e.g., if it travels longitudinally it travels about 20 mm or less or about 10 mm or less).

By way of summary, the teachings herein contemplate an article for a steering column assembly including a connection member having a base portion adapted to be attached to a column tube of the steering column assembly and optional opposing side walls extending from the base portion; and an energy absorption member. The energy absorption member may have a first generally flat segment, a second generally flat segment generally parallel to the first generally flat segment, and a curved portion therebetween. The second generally flat segment may extend from the base portion of the connection member. The energy absorption member may extend from the base portion of the connection member. The energy absorption member may be integrated into the connection member forming a singular piece. The energy absorption member may absorb energy by way of plastic deformation. The side walls may include a slot for receiving an elongated member (e.g., a tilt bolt). The article may further include a telescoping damper located at a forward end of the article adapted to contact a column housing of the steering column assembly. The article may be adapted to break away from a portion of the steering column assembly, such as during an impact exceeding a threshold load.

The present teachings also contemplate a telescoping adjustment subassembly. The subassembly may include the article described herein, an actuation member (e.g., a lever), an elongated member (e.g., a tilt bolt) adapted to be rotated by the actuation member, and a rotational member attached to or positioned on the elongated member. The rotational member may be adapted to be received between the opposing side walls of the article. The rotational member may engage with the base portion of the connection member when the subassembly is in a locked position. The rotational member may be a toothed cam.

The present teachings also contemplate a collapsing steering column assembly. The assembly may include a column tube; a steering shaft that is supported for rotation at least in part by the column tube; a column housing; a bracket for at least partially carrying the column tube; the article or telescoping adjustment subassembly as described herein; and a manually operated steering wheel adjustment subassembly including a lever for manually actuating the steering wheel adjustment subassembly. The article (e.g., at the base portion of the connection member) may be connected to the column tube via one or more rivets or fasteners. The article may be adapted to break away from the column tube upon an impact exceeding a threshold load. The column tube may be configured for telescoping insertion within the column housing. The steering wheel adjustment subassembly may be adapted for selectively adjusting the steering shaft, column tube, or both, in a fore or aft direction generally along the longitudinal axis. The steering wheel adjustment subassembly may be adapted for selectively raising or lowering the steering shaft, column tube, or both. The energy absorption member may have a first generally flat segment, a second generally flat segment generally parallel to the first generally flat segment, and a curved portion therebetween, where the second generally flat segment extends from the base portion of the connection member, and where the first generally flat segment extends into the column tube. The energy absorption member may be adapted to absorb energy by way of plastic deformation during a forward translation of a column tube during the impact. Deformation of the energy absorption member may be guided by a guide structure. The energy absorption member may, when employed, absorb energy by plastic deformation during the impact as the column tube translates along the column housing. The article may break away from the column tube upon the side walls and/or telescoping damper contacting a column housing and/or elongated member, such as a tilt bolt, of the steering column assembly. The article may break away from the column tube upon the impact as the connection member is held in position by engaging with the rotational member. The article may break away from the column tube upon shearing of one or more fasteners or rivets joining the article and the column tube.

As can be seen, it is thus possible to realize a unique assembly (and associated methods) that enable a steering column assembly to adjust telescopically, while also being able to absorb energy, particularly during a secondary impact.

BRIEF DESCRIPTION OF THE DRAWINGS

FIG. 2A is a side, partial cutaway view of an exemplary steering column assembly having a connection member, energy absorption member, and rotational member in accordance with the present teachings.

FIG. 2B is an exemplary fastener in accordance with the present teachings.

FIG. 2C is a bottom view of the assembly of FIG. 2A.

DETAILED DESCRIPTION

Figure 1:
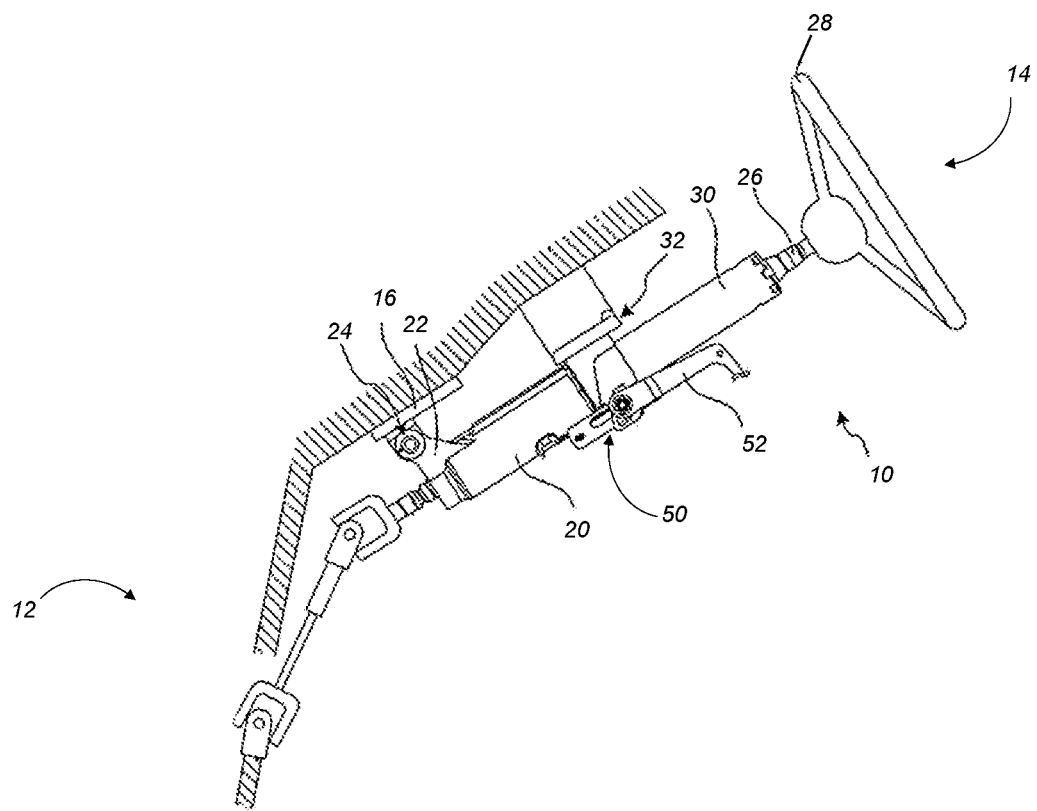
FIG. 1 is a side view of an exemplary steering column assembly in accordance with the present teachings.

As required, detailed teachings are disclosed herein; however, it is to be understood that the disclosed teachings are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings.

In general, and as will be appreciated from the description that follows, the present teachings pertain to a collapsing steering column assembly. The steering column assembly may include a mounting portion (e.g., one or more bracket structures) for securing the steering column assembly in a vehicle in a fixed operational position. The assembly may have a collapsing portion, at least a portion of which is adapted to travel forward relative to the mounting portion, while the mounting portion stays generally in its fixed operational position (e.g., any travel of the mounting portion is controlled and limited to an amount of about 50 mm or less, about 20 mm or less, or about 10 mm or less). Among its basic concepts the teachings are directed to a steering column assembly that, in the event of an impact such as a secondary impact that results in a load of a certain threshold amount (e.g., a load of about 0.5 kN or more or about 2 kN or more; a load of about 10 kN or less or about 5 kN or less), may be adapted so that at least a portion of the collapsing portion travels forward within the vehicle. The forward travel may be in a telescopic manner (e.g., at least one first structure that is operatively connected to a steering wheel (such as a column tube) may advance forward (e.g., along an axis that is generally parallel with (such as within about 10° or more, about 30° or less, or both, of being parallel with) a vehicle longitudinal axis) in a vehicle relative to at least one second structure that may at least partially surround the at least one first structure (e.g., a column housing)).

The teachings envision that the steering column assembly may include a tilt or rake adjustment that is adapted to allow a user to select an angle of inclination of a steering wheel, a reach adjustment that is adapted to allow a user to select an appropriate fore-aft position of the steering wheel, or both. In general, any such adjustment may be controlled by a suitable user operating device (e.g., a lever, an electromechanical actuator, motor, or otherwise). For a manually operated system, a lever or other user operating device may be adapted to control a force applied to maintain the collapsing portion in a user selected position. For example, a lever or other user operating device may be in operative engagement with one, two, or more mechanisms to releasably (and possibly adjustably as well) secure two or more components of the collapsing portion together. Securing may be realized by a suitable securing member (e.g., an elongated force applying member), such as a bolt (e.g., a tilt bolt), rod, strap, bar, band, wedge, rotational member such as a cam, or other suitable member, or a combination thereof. For instance, the securing member may be adapted, upon actuation of the user operating device to cause a cam or rotational member to rotate and engage with a portion of a connection member to secure the steering wheel at its desired telescoped position.

The teachings, in general, also envision the possible use of one or more energy absorption devices. The energy absorption devices may be a suitable device adapted to deform elastically and/or elastically and plastically. In the course of deforming, the energy absorption devices are thus adapted to absorb energy by way of the deformation. The energy absorption device may be operatively connected or located between or among two or more components. It may be configured so that it limits relative movement as between or among two or more components. The energy absorption devices may be wires, plates, strips, or the like. They may have a constant profile or a varying profile along their length. They may be employed to have one or more fixedly constrained portions (e.g., an end). They may have one or more free ends.

In examples illustrated, teachings describe aspects useful for an internally collapsing steering column assembly for an automotive vehicle. In general, an assembly of the teachings herein may include a steering shaft (e.g., one that can be coupled with a steering wheel or other steering device) and/or a column tube that supports the steering shaft (e.g., via one or more bearings). A column housing may be employed. It may be adapted to telescopically couple with the column tube. The column housing and column tube each may have a longitudinal axis that is generally parallel or even coaxial with each other. One or more brackets may be employed for at least partially securing either or both of the column tube or the column housing to the vehicle (e.g., to a cross-vehicle structure). The bracket or one or more tilt plates may include a suitable portion (e.g., a slot such as a generally vertically oriented slot) adapted to provide a guide structure for a tilt function. A user operating device, such as a lever, may be employed for allowing a user to manually operate the assembly. The steering column assembly may be configured so that in the event of a threshold load realized during an impact such as a secondary impact, at least a portion the assembly (e.g., the column tube, steering shaft, steering wheel, or a combination thereof) is able to translate forward from its typical operational position. Therefore, the column tube may thus be rendered able to translate forward relative to the column housing, carrying with it the steering wheel attached. As a result, it can be seen that it is possible that the steering wheel is rendered able to translate forward, e.g., away from the user. There may be one or more elements adapted to break away from another element of the assembly during this forward translation. For example, a connection member may break away from a column tube.

The teachings address an assembly that may typically include a column tube, a steering shaft, a bracket (e.g., a tilt bracket, a pivot bracket, or both), a column housing, and a steering wheel adjustment subassembly (e.g., a manually operated steering wheel adjustment subassembly). The steering wheel adjustment subassembly may include a lever (as discussed, or some other user operating device) adapted for actuating (e.g., manually actuating) the subassembly via tilt, telescoping, or both. One or more motors may be used instead of or in addition to manual actuation via a lever. For example, one or more motors or other electromechanical actuators may cause tilt, telescoping, or both. It is further contemplated that a lever may be used to cause a tilt or telescoping function, while a motor or other electromechanical actuator may be used to cause the other of the tilt or telescoping function. At least one method of engagement (e.g., a toothed rotational member, a pin, a clamping mechanism) may be employed to engage with the column tube or a structure secured thereto for selectively locking the steering shaft into a position (e.g., telescoped position) desired by a user (e.g., via the lever). One or more rotational members may be brought into and out of engagement (e.g., via interference) with a portion of a connection member for adjustment of the telescoping position desired by a user (e.g., via the lever). A mounting structure may detachably mount the steering wheel adjustment subassembly relative to the bracket (e.g., tilt bracket). During an impact such as a secondary impact, the column housing may remain in a generally fixed position relative to a forward pivot mounting location (e.g., any forward translation is limited to a relatively small amount (e.g., about 20 mm or less or about 10 mm or less)).

The assemblies as described herein generally will include a tube that is operatively connected with a steering wheel, e.g., via a steering shaft. One such tube, referred to herein as a column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the column tube may be made of or otherwise include a suitable metal, such as one or more of iron (e.g., steel), magnesium, zinc, or aluminum.

The column tube may be generally cylindrical and hollow. It may have a forward end portion and a rearward end portion, and a longitudinal axis. Either or both of the forward or rearward end portion may include a suitable bearing that supports the steering shaft for rotation.

The steering shaft may have a rearward end portion adapted to receive a steering wheel (not shown). It may have a forward end portion that penetrates through and may be supported by a bearing, a key lock collar or both. As noted, the steering shaft may be supported for rotation at least in part by the column tube and have a longitudinal axis that may be generally coaxially aligned with the longitudinal axis of the column tube.

One or more suitable brackets may be employed. Any such bracket may include a portion for mounting the steering column assembly within a vehicle (e.g., it can be secured to a vehicle structure, such as a cross vehicle beam, instrument panel, or otherwise). The bracket may have a portion that at least partially adjoins the steering shaft support structure (e.g., the column tube, the column housing, or both). For example, a bracket may include one or a plurality of downward depending (downwardly oriented) walls (e.g., tilt plates) that define a tilt portion of the bracket. One or more of the downward depending walls (e.g., tilt plates) may be adapted to provide a structure that has an elongated slot that provides guidance for the tilt function (e.g., it provides a guide path for a securing member such as a tilt bolt as it travels during adjustment; it may thus limit upward and downward travel). The bracket may be an integrated structure so that the tilt portion and the mounting portion are a single structure (e.g., a casting, a stamping, or a combination thereof). The bracket may be made of separate structures that are assembled together to define the mounting and tilt portions in a single structure. The mounting portion may be omitted and/or may be located elsewhere within the steering column assembly. For example, a mounting portion may be a pivot bracket located toward the forward end of the assembly, where the pivot point of the pivotal movement of the assembly occurs. The tilt portion may be omitted. A mounting bracket may be employed separately from a structure defining a tilt portion. Examples of brackets that may be employed, in addition to the examples described herein, include those of U.S. Publication No. 2010/0300238 (the entirety of which is incorporated by reference for all purposes; see, e.g., description of bracket 20); U.S. Pat. No. 6,467,807, the entirety of which is incorporated by reference for all purposes (see, e.g., description of brackets 6 and 7 and associated structure).

One or more brackets (e.g., tilt brackets) may be employed and adapted for receiving at least a portion of a steering shaft support structure (e.g., at least a portion of the column tube, the column housing, or both), and/or for mounting the steering column assembly within the automotive vehicle. By way of example, a tilt bracket of the present teachings may include an upper portion that is adapted to be secured to a vehicle structure, such as a cross vehicle beam, instrument panel, or otherwise. The bracket (e.g., tilt bracket) may have a pair of generally opposing downwardly oriented or projecting walls (e.g., tilt plates). The bracket (e.g., tilt bracket) may have a structure that at least partially flanks at least a portion of the steering shaft support structure (e.g., the column tube). The bracket (e.g., tilt bracket) may optionally include a pair of opposing side walls, and an upper wall that is configured to attach to the vehicle (e.g., to a cross vehicle beam, an instrument panel, or other suitable structure). The side walls may project outward relative to the upper wall (e.g., they may be generally orthogonally or obliquely disposed relative to the upper wall). The bracket (e.g., tilt bracket) may have a single downwardly projecting or oriented wall. The bracket (e.g., tilt bracket) may be disposed laterally above and outward relative to an opposing portion of the column housing.

It is possible that the teachings herein can be employed for steering column assemblies that are not adjustable, but which still require the ability to collapse. In such instances, there will be no rake or reach adjustment hardware. However, the concepts herein may still be adapted to achieve collapse. A mounting bracket may secure one or both of a column housing, or a column tube, to a vehicle. An energy absorption device may be employed to limit forward travel of one or more components of the steering column assembly, such as the column tube, steering shaft, or both.

The present teachings, however, have particular applicability for steering column assemblies that are adjustable (e.g., for rake and/or reach). The assembly may include a manually operated steering wheel adjustment subassembly adapted for selectively adjusting the steering shaft in a fore or aft direction generally along the longitudinal axis, selectively raising or lowering the steering shaft, or both. The steering wheel adjustment subassembly may include a lever or other adapted for manually actuating the subassembly. The subassembly may include at least one engagement member (e.g., a pin) that is brought into and out of engagement with the column tube or a structure secured thereto for selectively locking the steering shaft into a position desired by a user (e.g., a fore or aft position). Other suitable hardware may be employed in the subassembly, such as one or more thrust bearings, one or more nuts, one or more cam fix elements, and/or one or more cam move elements (e.g., where the cam fix and the cam move elements are in opposing operative relationship with each other, such as by contacting each other).

A column housing is pivotally mounted at a pivot mounting location (e.g., a permanently fixed mounting) within the automotive vehicle. The pivot mounting location may be at or within about 20, about 30, about 40 or about 50 mm of a forward end of the column housing. The pivot mounting location may be on an underside of the column housing, on a top side of the column housing, or at some location in between the topside and the underside of the column housing. The column housing at least partially surrounds the column tube. The column housing may have one or more projections or other structures to receive a biasing device (e.g., a spring) that connects the column housing with the tilt bracket. The column housing may be a cast structure (e.g., including a metal such as aluminum, magnesium, zinc, and/or iron (e.g., steel)). During a secondary impact, the column housing may remain in a generally fixed position relative to the pivot mounting location. It may be secured in such a way that it translates forward a relatively small amount (e.g., about 50 mm or less, about 20 mm or less, or about 10 mm or less).

During an impact (such as a secondary impact), the structures of the present teachings may be configured to include a suitable combination of elements arranged in a manner so that a column tube, steering shaft, or both, is able to translate forward longitudinally relative to the column housing.

The assembly herein includes a tilt adjustment subassembly. The subassembly may include a tilt bracket having one or more tilt plates or two or more tilt plates extending downwardly on opposing sides of the column tube, column housing, or both. The tilt plates may include one or more generally vertical slots. A tilt bolt or other elongated fastener may extend between the two tilt plates, and the tilt bolt may be received within the vertical slots. The height adjustment of the assembly may be possible by the tilt bolt moving upwardly or downwardly in the slots when the user operating device, such as a lever, is in an unlocked position. The assembly may be held at the desired angle or height when the user operating device, such as a lever, is moved into the locked position.

The present teachings also contemplate a telescope adjustment subassembly. Features of the telescope adjustment subassembly may also serve to absorb energy during an impact, such as a secondary impact. The telescope adjustment subassembly may allow for adjustment of the steering wheel in a fore and aft position relative to a vehicle occupant (e.g., driver). The telescope adjustment subassembly may include a lever or other actuating member that allows the subassembly to be put into a locked and/or unlocked position. Upon unlocking the telescope adjustment subassembly, a user may be permitted to adjust the steering wheel. Upon locking the telescope adjustment subassembly, the steering wheel may remain in the desired location.

The telescope subassembly may include a connection member that is secured to an outer surface of the column tube. The connection member may provide a surface for engagement with another element of the assembly (e.g., for locking and/or unlocking the telescope adjustment subassembly). The connection member may act as a stop, restricting the fore and/or aft translation during adjustment. The connection member may act as a guide for fore and/or aft translation during adjustment. The connection member may act to contact a portion of the column housing during an adjustment and/or during an impact exceeding a threshold load. Contacting the column housing may trigger a breakaway of the connection member from the column tube, thereby providing energy absorption characteristics.

The connection member may include a base portion. The base portion may provide a contact surface between the connection member and the outer surface of the column tube. The base portion may be generally planar. The base portion may have a generally complementary shape to the column tube to reduce or prevent rocking of the connection member. The base portion may have one or more openings for receiving a fastener to secure the connection member to the column tube. The base portion may provide a contact surface for another element of the assembly, such as a rotational member for locking the steering wheel (and/or other elements of the steering column assembly) in a desired position.

The fastener joining the connection member to the column tube may be any fastener capable of maintaining connection between the connection member and the column tube during normal operation and adjustment of the steering column assembly. The fastener may be a shearable fastener. The fastener may, therefore, shear upon an impact exceeding a threshold load, thereby allowing the connection member to break away from the column tube. The fastener may be a screw, pin, rivet, bolt, or the like. The fastener may be formed of a polymeric material. The fastener may be formed from a metal or metal alloy.

The connection member may have one or more side walls extending from the base portion. The side walls may increase stiffness of the connection member. The side walls may be generally parallel. The side walls may be in a generally opposing relationship. The side walls and base may define a cavity or channel within which a rotational member may be permitted to rotate. The side walls may include one or more slots for receiving an elongated member (e.g., a tilt bolt). The elongated member may be permitted to travel within the slot during a telescoping adjustment. The elongated member may remain stationary within the assembly, while the connection member (i.e., joined to the column tube) may be permitted to move when the telescope adjustment subassembly is in an unlocked position. The slot may define the distance fore and/or aft that the steering wheel (and/or other elements of the steering column assembly) is able to translate during adjustment. The slot may serve as a stop during telescope adjustment. The front and/or rear edge of the slot may restrict further movement as the elongated member contacts the edge. The top edge of the slot may be positioned to react loads (e.g., tooth separation or cam-over) generated from the rotational member interacting with the base portion. The top edge of the slot and the elongated member can be configured such that when the lock lever is in the unlock position, there is sufficient clearance between the top edge of the slot and the elongated member to allow for smooth telescopic adjustment. When the lock lever is in the locked position, the elongated member and top edge of the slot may be in close clearance or contacting. The side walls may be a lip extending from the base. The connection member may instead be free of side walls. For example, in a connection member free of side walls, the base portion may be thicker or may include portions that are thicker to achieve a desired stiffness of the connection member. The connection member may include one or more friction plates, such as those described in U.S. Pat. No. 9,904,590, incorporated herein by reference (e.g., instead of or in addition to the side walls of the connection member).

A forward end of one or more of the side walls may be adapted to contact the column housing during adjustment in a forward direction and/or during an impact exceeding a threshold load. The contact between one or more side walls and the column housing may act as a stop, limiting further forward travel. A telescoping damper may be secured to the forward end of the side walls or another portion of the connection member to provide a soft stop and/or a contact surface between the connection member and the column housing. The telescoping damper may, for example, be formed of a polymeric material to cause a soft stop, reduce noise upon contact, provide further absorption of energy upon contact, or a combination thereof. During an impact exceeding a threshold load, the column tube may be forced forward, causing the connection member and/or telescoping damper to contact a portion of the column housing. Additional forward movement of the connection member may be inhibited. As the column tube may be permitted to continue to translate forward, the connection member may break away from the column housing (e.g., through shearing of the fasteners joining the column tube and the connection member). This breakaway may provide for energy absorption within the steering column assembly. It is also contemplated that the breakaway of the connection member from the column tube may occur upon contact with an elongated member, such as a tilt bolt, alone or in combination with the connection member contacting a portion of column housing. As the column tube translates forward, a portion of the connection member may contact the elongated member, such as a tilt bolt. This contact may cause the column tube and connection member to separate (e.g., through shearing of the fasteners joining the column tube and the connection member), thereby causing the breakaway.

The telescope adjustment subassembly may include one or more features for locking the steering wheel and associated elements in a desired telescope position. The subassembly may include a rotational member joined to the elongated member (e.g., the tilt bolt). Upon actuation of the lever, the elongated member may rotate, thereby rotating the rotational member. The rotational member may, for example, be a locking cam arrangement. The rotational member may have a toothed surface or other frictional surface or complementary shaped surface that engages with another portion of the subassembly to lock the steering column assembly in place. The rotational member may be situated between the opposing side walls of the connection member. The rotational member may engage with the base portion of the connection member when in a locked position. It is contemplated that the base portion may have a surface that enhances engagement with the rotational member. For example, the base portion may have a generally complementary texture or shape or a toothing arrangement. The present teachings also contemplate an assembly that is free of a rotational member.

The rotational member may cause or assist in the breakaway of the connection member from the column tube during an impact exceeding a threshold load (e.g., instead of or in addition to the side walls and/or telescope damper causing or assisting in the breakaway). Upon impact, the column tube may be forced to translate forward. With the rotational member in a locked position, thereby inhibiting or restricting movement of the connection member, the connection member may be caused to break away from the column tube (e.g., through shearing of the fasteners). The column tube may be permitted to further travel forward, while the connection member remains in place.

The assembly herein may further employ an energy absorption structure. For instance, the assembly herein may include at least one deformable energy absorption device (e.g., a bend plate, a wire, or some other structure adapted to be carried at least partially by the column housing), wherein the energy absorption device, when employed, absorbs energy by plastic deformation during the secondary impact after the steering shaft support structure (e.g., column tube and steering shaft) starts to translate along the column housing. The energy absorption member may plastically deform. It may deform with or without plastic elongation, with or without plastic compaction, with or without plastic buckling, or any combination thereof. Any plastically deformable energy absorption device may thus limit the extent of longitudinal travel of the column tube, steering shaft, or both. The energy absorption member may function to secure the position of the column tube, steering shaft, steering wheel, or a combination thereof in a desired fore or aft direction. The energy absorption plate may include two or more generally planar or flat sections that are generally parallel to each other. The generally planar or flat sections may be joined at an arcuate or curved portion. A portion of the energy absorption member may be fixedly attached to the column tube (e.g., via one or more fasteners such as screws, rivets, or pins; via one or more adhesives; via one or more methods such as soldering or welding; or a combination thereof), fixedly attached to the connection member, or both. A portion of the energy absorption member may engage with an opening, notch, or guide in the column tube (e.g., with or without additional fastening). The energy absorption member may be connected to the connection member. The energy absorption member may be integrally formed with the connection member. The energy absorption member may extend from the base portion of the connection member, for example.

A portion of the energy absorption member may be located within the column tube. For example, a first generally flat segment may be received within the column tube. The curved or arcuate portion may curve around an edge or notch of the column tube. The second generally flat segment may be located on or adjacent the outer wall of the column tube. Upon an impact exceeding a threshold load, the column tube may translate forward, pushing the energy absorption member forward, causing deformation. The curved portion may be caused to straighten or otherwise deform. As the column tube continues to translate forward, different areas of the energy absorption member may be caused to curve or otherwise deform. For example, the first generally flat segment may become shorter, while the second generally flat segment may become longer and the area of the curved portion continues to change as the column tube translates forward and deformation is guided around the edge of the column tube and/or a guide structure.

The energy absorption member may be situated so that a portion (e.g., an end) of the member is received within the column tube, such as within an opening. The portion received within the column tube may be generally perpendicular to the generally flat segments. The curved segment may be wrapped around a guide structure such as a pin. As the column tube translates forward during a secondary impact, the column tube may push the portion of the energy absorption member forward, thereby causing the energy absorption member to be pulled around the guide structure.

A guide structure may be located on the edge or at a notch of the column tube. The guide structure may be separate from the column tube. The guide structure may function to guide deformation of the energy absorption member (e.g., upon an impact exceeding a threshold load). The guide structure may function to hold the energy absorption member in position during ordinary use. The guide structure may have one or more slots for receiving at least a portion of the energy absorption member. The guide structure may be a pin or other member around which the energy absorption member may wrap or coil. The guide structure may be formed of any material suitable for withstanding the forces exerted upon it during the energy absorption member wrapping around it during a collision. For example, the guide structure may be formed of a polymeric material.

Turning now to the figures, FIG. 1 illustrates a steering column assembly 10 having a forward end 12 and a rearward end 14. The steering column assembly 10 is secured to a vehicle body 16 at one or more places. As shown a column housing 20 is pivotally attached to the vehicle via a pivot bracket 22, located at the forward end 12, though other configurations and brackets for mounting are also contemplated. The pivotal connection 24 allows for tilt adjustment of the steering column assembly. The steering column assembly 10 includes a steering shaft 26 at the rearward end 14, which is adapted for supporting a steering wheel 28. The steering shaft 26 is supported by a column tube 30, which are both supported by the column housing 20. The column tube 30 is movable relative to the column housing 20, particularly in a fore and aft direction for telescoping adjustment. The steering column assembly 10, as shown, includes a tilt bracket 32, which further attaches the steering column assembly to the vehicle and that allow for adjustment of the positioning of the steering wheel 28 relative to a user. The steering column assembly 10 may be adjusted in a telescoping manner by a telescoping subassembly 50. Adjustment via the telescoping subassembly 50 may be initiated by operating a lever 52, which disengages adjustment mechanisms or unlocks the mechanisms, allowing a driver to put the steering wheel 28 in a desired position.

FIG. 2A illustrates a side view of a portion of a steering column assembly 10 including a tilt subassembly 48 supported by a tilt bracket 32 and telescoping subassembly 50, which allows the column tube 30 to translate relative to the column housing 20. FIG. 2C illustrates an underside view of the steering column assembly 10 of FIG. 2A. The position of the column tube 30 is permitted to be adjusted upwardly and downwardly relative to a driver or user of the vehicle via the tilt subassembly 48, which includes an elongated member 46 (see FIG. 2C) supported by one or more tilt plates 42, having a slot 44 that is generally vertically oriented. The angle of the column tube 30 can be adjusted manually via unlocking the lever 52 and moving the steering wheel 28 (see FIG. 1) to the desired height. The elongated member 46 is permitted to move along the slot 44 during tilt adjustment and locks in place upon locking the lever 52.

The steering column assembly 10 further includes a connection member 60 secured to the column tube 30 via one or more fasteners 72 (e.g., pins or rivets). An exemplary fastener 72 is shown in FIG. 2B. These fasteners may be adapted to shear upon being subjected to a force, such as a column tube translating forward during a collision exceeding a threshold load. The connection member 60 includes a base 62, which contacts and/or bears against the column tube 30. Opposing side walls 64 extend from the base portion, creating a channel 66. The channel 66 is adapted to receive a rotational member 54.

The connection member 60 supports an energy absorption member 80. As shown, the energy absorption member 80 includes a first generally flat segment 82, a second generally flat segment 84, and a curved portion 86 joining the flat segments. The energy absorption member 80 optionally includes an engagement portion 88 that extends into an opening or notch in the column tube 30. Upon forward translation of the column tube, such as during an impact exceeding a threshold load, the column tube 30 may contact the engagement portion 88, pushing it in a forward direction and causing the energy absorption member 80 to deform. Deformation may be guided by a guide structure 90, which may, for example, include a pin, an elongated member, a cross member (e.g., extending generally transverse to the longitudinal axis of the energy absorption member, column tube, or both), a cylindrical member, the like, or a combination thereof. The energy absorption member 80 may be pulled forward and may coil around the guide structure 90 as the column tube 30 translates forward.

During telescoping adjustment of the assembly, the user may actuate the lever 52, which may cause the elongated member 46 to rotate. A rotational member 54 associated with or secured to the elongated member 46 thereby also rotates. The rotational member 54 as shown includes a toothed surface 56 that is adapted to engage with the base 62 of the connection member 60 secured to the column tube 30 to put the steering column assembly in a locked position. In the event of a collision, resulting in an impact exceeding a threshold load, the column tube 30 may be adapted to translate forward. As the toothed surface 56 of the rotational member 54 retains engagement with the connection member 60, the connection member 60 remains in place, breaking away from the forwardly translating column tube and/or causing the fasteners 72 to shear. The energy absorption member 80, as described above, may then deform.

Figure 3:
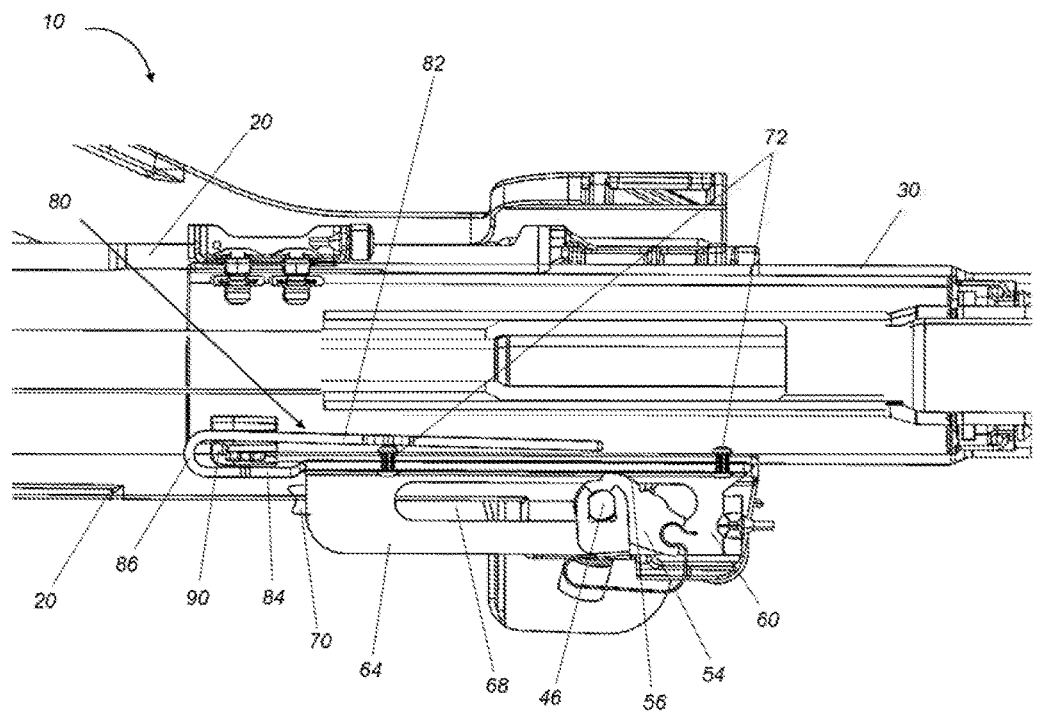
FIG. 3 is a side, partial cutaway view of an exemplary steering column assembly having a connection member with integrated energy absorption member and a rotational member in accordance with the present teachings.
Figure 4:
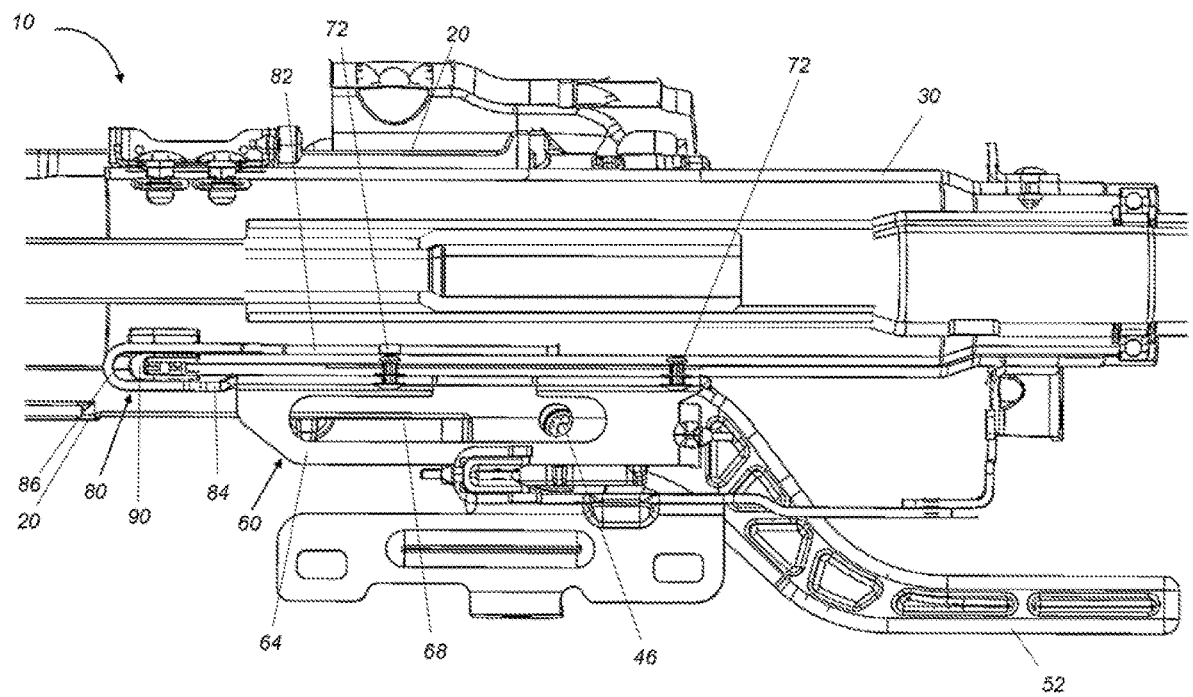
FIG. 4 is a side, partial cutaway view of an exemplary steering column assembly having a connection member with integrated energy absorption member in accordance with the present teachings.

FIGS. 3 and 4 illustrate an exemplary steering column assembly 10 where the energy absorption member 80 is integrated into or connected to the connection member 60. The energy absorption member 80 includes a first generally flat segment 82 located within the column tube 30. The second generally flat segment 84 is connected to or integral with the base of the connection member 60. A curved portion 86 joins the two flat segments, allowing them to be in a generally parallel relation with each other. The connection member 60 includes opposing side walls 64 having a slot 68 for receiving an elongated member 46 and to assist in facilitating telescoping adjustment. As discussed in with respect to FIGS. 2A and 2C, actuating a lever 52 (not shown in FIG. 3) can cause the elongated member 46 to rotate, thereby also rotating a rotational member 54 (see FIG. 3). The rotational member 54 includes a toothed surface 56, where the toothed surface engages with the base of the connection member 60 when the assembly is in a locked position. FIG. 4 illustrates an assembly that is free of the rotational member, and thereby includes a different locking mechanism for securing the assembly in a desired position.

The connection member 60 acts as a stop plate during telescoping adjustment and/or forward translation of the column tube 30 (e.g., upon an impact exceeding a threshold load). As the column tube 30 translates forward, a portion of the connection member 60 contacts the column housing 20. During an impact exceeding a threshold load, upon contacting the column housing 20, the fasteners 72 connecting the connection member 60 to the column tube 30 may shear, thereby causing a breakaway between the column tube 30 and the connection member 60 and allowing the column tube 30 to continue with forward translation, while the connection member 60 remains in place. The connection member 60, at its forward end, optionally includes a telescope damper 70 (see FIG. 3), which contacts the column housing 20. The telescope damper 70 may provide for a soft stop during telescoping adjustment and/or may provide a contact surface between the connection member and the column housing (e.g., during normal adjustment and/or upon an impact exceeding a threshold load).

During an impact, the energy absorption member 80 may deform, thereby acting to absorb energy and/or slow the collapse of the steering column assembly. As the column tube 30 translates forward, it will contact the curved portion 86, causing that portion to straighten or otherwise deform. A new curved portion 86 may form (e.g., in an area previously part of the first generally flat segment 82), as the deformation of the energy absorption member 80 is guided by a guide structure 90 (or the column tube without a guide structure). The guide structure 90 may be attached to the column tube 30 (e.g., at a notch in the column tube). Assemblies free of the guide structure are also contemplated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, it may be possible to make the steering wheel adjustment subassembly from multiple subassemblies. The energy absorption mechanism described may be substituted with some other mechanism. Though the teachings herein may reference to a secondary impact events as occasioning certain of the functional aspects of the teachings, the teachings are not solely limited to secondary impact events. Rather, where reference is made to secondary impact, unless otherwise qualified, the teachings should be regarded as contemplating other impacts or conditions in which a threshold load (e.g., in a forward facing direction in a vehicle) is encountered that substantially exceeds a normal operational load and where translation of the column tube may be desirable for substantially reducing load that otherwise would be transferred to a vehicle operator.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Geometries shown in the drawings (though not intended to be limiting) are also within the scope of the teachings, even if not verbally described.

What is claimed is:

1. An article for a steering column assembly comprising:
   a. a connection member having a base portion adapted to be attached to a column tube of the steering column assembly and opposing side walls extending from the base portion; and
   b. an energy absorption member;
      wherein the energy absorption member extends from the base portion of the connection member;
      wherein at least a portion of the article is adapted to break away from the column tube upon an impact exceeding a threshold load.

2. The article of claim 1, wherein the energy absorption member is integrated into the connection member forming a singular piece.

3. The article of claim 1, wherein the energy absorption member has a first segment, a second segment, and a curved portion therebetween.

4. The article of claim 3, wherein the second segment extends from the base portion of the connection member.

5. The article of claim 1, wherein the side walls include a slot for receiving an elongated member.

6. The article of claim 1, comprising a telescoping damper located at a forward end of one or more of the side walls adapted to contact a column housing of the steering column assembly.

7. The article of claim 6, wherein the portion of the article that breaks away is adapted to break away from the column tube when the telescoping damper contacts the column housing.

8. The article of claim 1, wherein the energy absorption member absorbs energy by way of plastic deformation.

9. The article of claim 1, wherein the connection member is adapted to break away from a portion of the steering column assembly during the impact exceeding the threshold load.

10. A telescoping adjustment subassembly comprising:
    a. the article of claim 1;
    b. an actuation member;
    c. an elongated member adapted to be rotated by the actuation member; and
    d. a rotational member attached to or positioned on the elongated member;
       wherein the rotational member is adapted to be received between the opposing side walls of the article, and
       wherein the rotational member engages with the base portion of the connection member when the subassembly is in a locked position.

11. The telescoping adjustment subassembly of claim 10, wherein the rotational member is a toothed cam.

12. The telescoping adjustment subassembly of claim 10, wherein the portion of the article breaks away from the column tube upon the impact as the connection member is configured to be held in position by engaging with the rotational member.

13. A collapsing steering column assembly comprising:
    a. a column tube;
    b. a column housing;
    c. the article of claim 1, wherein the article is secured to the column tube;
    d. a manually operated steering wheel adjustment subassembly including a lever for manually actuating the steering wheel adjustment subassembly;
       wherein at least a portion of the article is adapted to break away from the column tube upon an impact exceeding a threshold load.

14. The collapsing steering column assembly of claim 13, wherein the column tube is configured for telescoping insertion within the column housing.

15. The collapsing steering column assembly of claim 13, wherein the energy absorption member is adapted to absorb energy by way of plastic deformation during a forward translation of column tube during the impact.

16. The collapsing steering column assembly of claim 13, wherein the portion of the article breaks away from the column tube upon the side walls and/or a telescoping damper contacting the column housing.

17. The collapsing steering column assembly of claim 13, wherein the article breaks away from the column tube upon shearing of one or more fasteners or rivets joining the connection member and the column tube.

18. The collapsing steering column assembly of claim 13, wherein the energy absorption member has a first segment, a second segment, and a curved portion therebetween, wherein the second segment extends from the base portion of the connection member, and wherein at least a portion of the first segment extends into the column tube.

19. The collapsing steering column assembly of claim 13, wherein deformation of the energy absorption member is guided by a guide structure.

20. The collapsing steering column assembly of claim 13, wherein the side walls of the connection member include a slot that receives an elongated member, and wherein the portion of the article breaks away from the column tube upon the elongated member contacting an end of the slot of the side walls.

* * * * *

UNITED STATES PATENT AND TRADEMARK OFFICE
CERTIFICATE OF CORRECTION

| | | |
|---|---|---|
| PATENT NO. | : 11,845,487 B2 | |
| APPLICATION NO. | : 17/971735 | |
| DATED | : December 19, 2023 | |
| INVENTOR(S) | : Isabel Chong Hok Yuen et al. | |

It is certified that error appears in the above-identified patent and that said Letters Patent is hereby corrected as shown below:

In the Claims

Column 18, Line 25, Claim 15 insert --the-- before "column tube".

Signed and Sealed this
Twenty-seventh Day of February, 2024

Katherine Kelly Vidal
*Director of the United States Patent and Trademark Office*